United States Patent
Itahara

[19]

[11] Patent Number: 6,061,394
[45] Date of Patent: May 9, 2000

[54] DIGITAL COMMUNICATION SYSTEM MODULATED SIGNAL GENERATION APPARATUS INCORPORATING FADING SIMULATOR

[75] Inventor: Hiroshi Itahara, Atsugi, Japan

[73] Assignee: Anritsu Corporation, Tokyo, Japan

[21] Appl. No.: 08/976,462

[22] Filed: Nov. 21, 1997

[30] Foreign Application Priority Data

Nov. 28, 1996 [JP] Japan ..................................... 8-317957

[51] Int. Cl.⁷ ............................. H04B 17/00; H04B 3/46; H09L 1/20
[52] U.S. Cl. ......................................................... 375/227
[58] Field of Search .................................. 375/224, 227, 375/226, 206, 296, 285

[56] References Cited

U.S. PATENT DOCUMENTS

| | | | |
|---|---|---|---|
| 4,628,517 | 12/1986 | Schwarz et al. | 375/267 |
| 5,539,772 | 7/1996 | Fasulo II et al. | 375/224 |
| 5,764,685 | 6/1998 | Tanaka et al. | 375/200 |
| 5,926,510 | 7/1999 | Suzuki | 375/285 |
| 5,937,004 | 8/1999 | Fasulo II et al. | 375/224 |

FOREIGN PATENT DOCUMENTS 8-37485   2/1996   Japan .

OTHER PUBLICATIONS

TIA/EIA Interim Standard; "Mobile Station–Base Station Compatibility Standard for Dual–Mode Wideband Spread Spectrum Cellular System"; TIA/EIA/IS–95–A; May 1995.

TIA/EIA Interim Standard; "Recommended Minimum Performance Standards for Dual–Mode Wideband Spread Spectrum Cellular Mobile Stations"; TIA/EIA/IS–98; Dec. 1994.

*Primary Examiner*—Don Vo
*Assistant Examiner*—Phuong Phu
*Attorney, Agent, or Firm*—Frishauf, Holtz, Goodman, Langer & Chick, P.C.

[57] ABSTRACT

A digital communication system modulated signal generation apparatus incorporates a fading simulator for adding fading to a signal to be transmitted to a device to be tested. A baseband signal generation unit generates a digital baseband signal at a predetermined clock rate, and sequentially outputs time information corresponding to the predetermined clock rate. A fading parameter generation unit receives the time information sequentially output from the baseband signal generation unit together with the digital baseband signal, and output a desired fading parameter set in advance in correspondence with the time information. A fading addition operation unit executes a fading addition operation for the digital baseband signal output from the baseband signal generation unit by using the desired fading parameter output from the fading parameter generation unit, and outputs a signal indicating the result. A digital/analog conversion unit D/A-converts the signal output from the fading addition operation unit. A quadrature modulation unit quadrature-modulates the signal converted by the digital/analog conversion unit, and outputs the quadrature-modulated signal as a modulated signal.

18 Claims, 6 Drawing Sheets

```
FREQ: 10,000 000 MHz    LEVEL: -30.0 dBm
                (L.C.P. ON)

REF FREQ; 10MHz              UNCAL

NEXT
                                                    FRAME

MODULATION MODE: I,Q    SOURCE   : [INT]

SYSTEM         : [IS-95] CHIP RATE: 1.2288Mcps

SIMULATION LINK: [FORWARD] FILTER : [SPEC1+EQ]

LEVEL CONTROL PROGRAM EDIT WINDOW   FRAME:1/40

┌─────────────────────────────────────────────┐    LEVEL C.P.
│    TO BE LAST PAGE                          │
│  PCG 1: [ 0] PCG 5: [ 0] PCG 9: [ 0] PCG13: [ 0] │  ON   OFF
│  PCG 2: [ 0] PCG 6: [ 0] PCG10: [ 0] PCG14: [ 0] │
│  PCG 3: [ 0] PCG 7: [ 0] PCG11: [ 0] PCG15: [ 0] │
│  PCG 4: [ 0] PCG 8: [ 0] PCG12: [ 0] PCG16: [ 0] │  SETUP/*
│                          TO BE NEXT PAGE    │    PARAMETER
└─────────────────────────────────────────────┘    MEMORY

LEVEL C.P. SEQUENCE: [          ]

*
                                                     ETC
```

DIGITAL COMMUNICATION SYSTEM MODULATED SIGNAL GENERATION APPARATUS INCORPORATING FADING SIMULATOR

BACKGROUND OF THE INVENTION

The present invention relates to a modulated signal generation apparatus for supplying a modulated test signal to various electronic devices generally incorporated in the digital communication system such as an automobile telephone system, a portable telephone system, and a simple portable telephone system and, more particularly, to a modulated signal generation apparatus incorporating a fading simulator.

Figure 7:
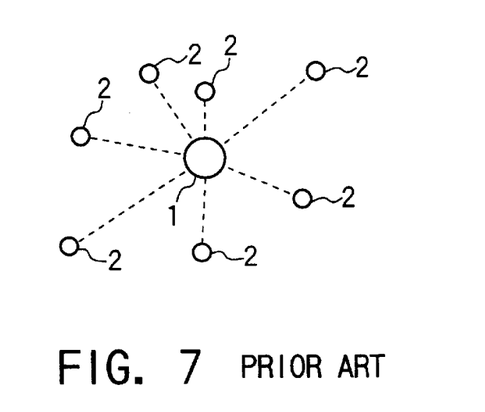
FIG. 7 is a schematic view showing a general digital communication system.

As is well known, in the digital communication system, a plurality of mobile stations 2 can communicate with one base station or cell site 1, as shown in FIG. 7.

Signals exchanged between the base station 1 and the mobile stations 2 are generally modulated signals prepared by modulating radio-frequency carrier signals by transmission data.

Figure 8A:
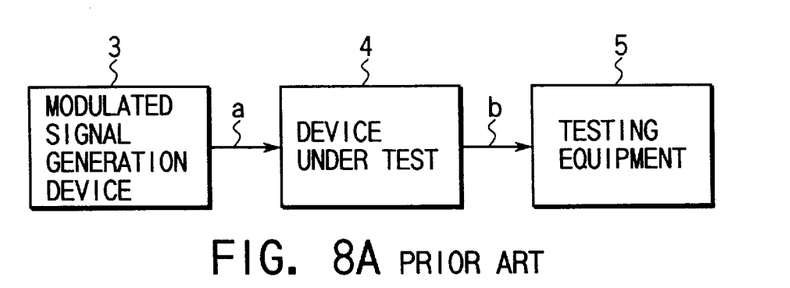
FIGS. 8A and 8B are block diagrams, respectively, showing a measurement method for a general device under test.

When the performance of each electronic device incorporated in the digital communication system is to be measured, a modulated test signal a is generated by a modulated signal generation device 3 and supplied to a device under test 4, and an output signal b from the device under test 4 is input to a testing equipment 5, as shown in FIG. 8A.

The output signal b is analyzed by the testing equipment 5 to measure various performances of the device under test 4.

When each mobile station 2 is connected to the base station 1 using a radio medium as in the digital communication system shown in FIG. 7, a fading phenomenon as a phenomenon unique to the radio wave occurs in transmitted and received signals.

Accordingly, the fading phenomenon also occurs in signals input to the base station 1 and each mobile station 2.

For this reason, the antifading performances (the reciever performances in fading enrichment) of various electronic devices of the base station 1 and each mobile station 2 must be measured.

Figure 8B:
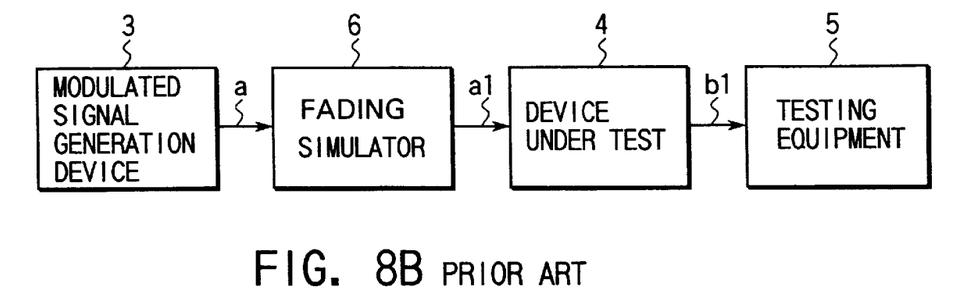

To measure the antifading performance, a fading simulator 6 is inserted between the modulated signal generation device 3 and the device under test 4 to measure the antifading performance, as shown in FIG. 8B.

More specifically, the fading simulator 6 is used to forcibly cause fading in the modulated test signal a output from the modulated signal generation device 3, supplying a modulated test signal $a_1$ containing fading to the device under test 4.

The testing equipment 5 analyzes an output signal $b_1$ from the device under test 4 to measure the antifading performance of the device under test 4.

Figure 9:
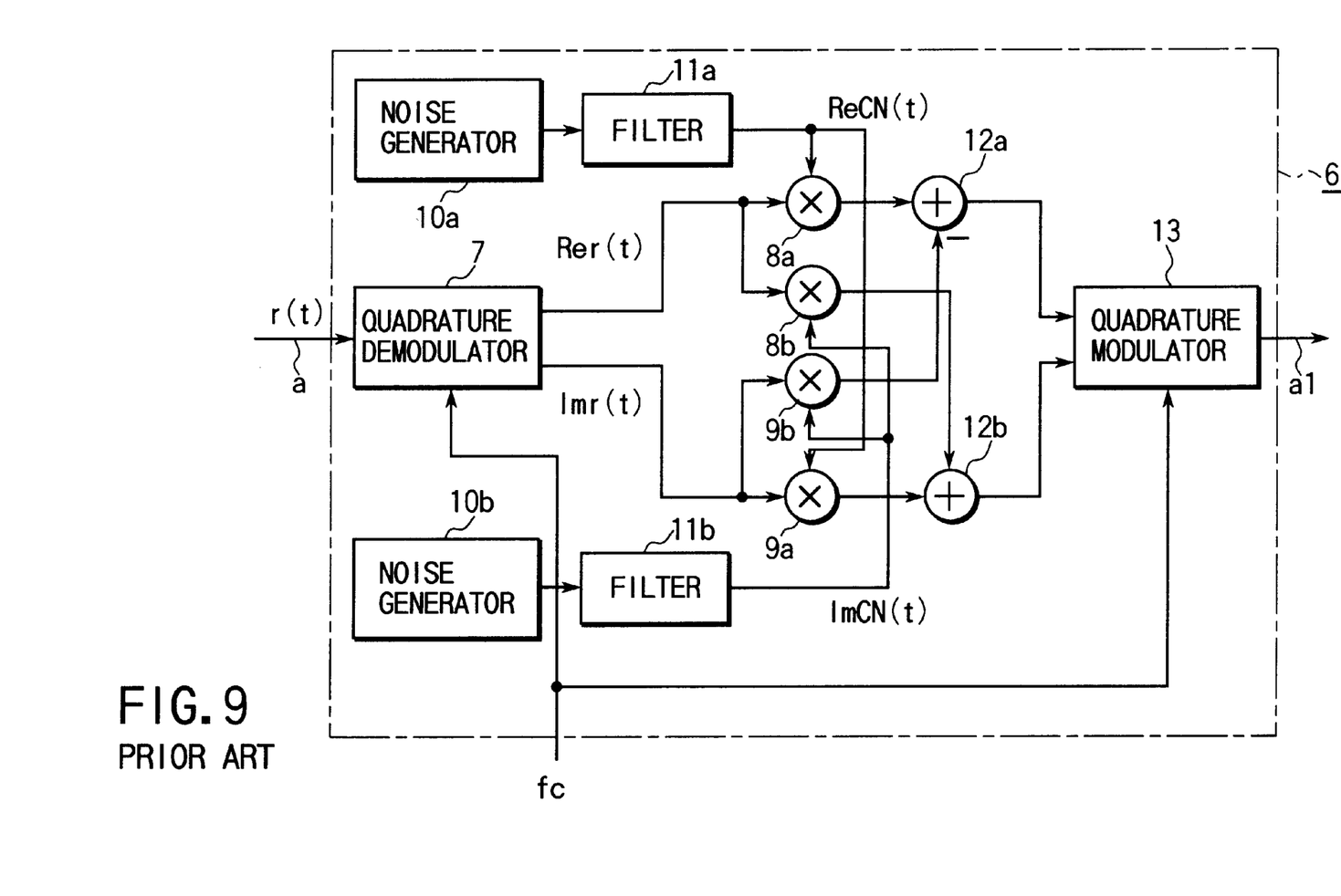
FIG. 9 is a block diagram showing the schematic arrangement of a conventional fading simulator.

In this case, the fading simulator 6 is constituted as shown in FIG. 9.

The modulated signal generation device 3 outputs an analog modulated test signal a quadrature-modulated by a plurality of data.

If t is the time, and j is the imaginary unit, then the modulated test signal a is given by an equation of adding in-phase and quadrature components to each other such as equation (1):

$$r(t)=Re\{r(t)\}+j \cdot Im\{r(t)\} \tag{1}$$

The modulated test signal a input to the fading simulator 6 is input to a quadrature demodulator 7.

The quadrature demodulator 7 demodulates the modulated test signal a into a baseband signal made up of an in-phase component signal $Re\{r(t)\}$ and a quadrature component signal $Im\{r(t)\}$ by using a carrier frequency $f_c$ of the modulated test signal a.

The in-phase component signal $Re\{r(t)\}$ and quadrature component signal $Im\{r(t)\}$ of the baseband signal are respectively input to multipliers 8a, 8b, 9a, and 9b.

Noise generators 10a and 10b generate white Gaussian noise signals.

The white Gaussian noise signals output from the noise generators 10a and 10b are respectively frequency-regulated by fading filters 11a and 11b on the output stage to be output as fading signals.

That is, the white Gaussian noise is frequency-regulated by the fading filter having pre-equalizing frequency characteristics to be changed into colored noise with a very narrow band. This chromatic noise has been proved to extremely approximate the fading phenomenon.

A fading signal CN(t) generated by the noise generators 10a and 10b and the fading filters 11a and 11b is given by an equation of adding the in-phase fading signal $Re\{CN(t)\}$ and the quadrature fading signal $Im\{CN(t)\}$ to each other such as equation (2):

$$CN(t)=Re\{CN(t)\}+j \cdot Im\{CN(t)\} \tag{2}$$

One fading filter 11a outputs the in-phase fading signal $Re\{CN(t)\}$, whereas the other fading filter 11b outputs the quadrature fading signal $Im\{CN(t)\}$.

The in-phase fading signal $Re\{CN(t)\}$ is supplied to the multipliers 8a and 9a, and the quadrature fading signal $Im\{CN(t)\}$ is supplied to the multipliers 8b and 9b.

Output signals from the multipliers 8a and 9b are added by an adder 12a, and the obtained signal is input as a new in-phase component signal $Re\{S(t)\}$ to one terminal of a quadrature modulator 13.

Output signals from the multipliers 9a and 8b are added by an adder 12b, and the obtained signal is input as a new quadrature component signal $Im\{S(t)\}$ to the other terminal of the quadrature modulator 13.

The new in-phase and quadrature component signals $Re\{S(t)\}$ and $Im\{S(t)\}$ which have undergone fading and are input to the quadrature modulator 13 are given by equations (3) and (4):

$$Re\{S(t)\}=[Re\{r(t)\} \times Re\{CN(t)\}]-[Im\{r(t)\} \times Im\{CN(t)\}] \tag{3}$$

$$Im\{S(t)\}=[Re\{r(t)\} \times Im\{CN(t)\}]+[Im\{r(t)\} \times Re\{CN(t)\}] \tag{4}$$

The quadrature modulator 13 quadrature-modulates a carrier signal having the frequency $f_c$ with the baseband signals of the in-phase and quadrature component signals $Re\{S(t)\}$ and $Im\{S(t)\}$, and externally outputs the quadrature-modulated signal as a new modulated test signal $a_1$.

The modulated test signal $a_1$ which has undergone fading and is output from the fading simulator 6 is input to the device under test 4.

An amplitude disturbance factor A(t) in the modulated test signal $a_1$ having undergone fading is given by equation (5):

$$A(t)=[Re\{CN(t)\}^2+Im\{CN(t)\}^2]^{1/2} \tag{5}$$

A phase disturbance factor $\phi(t)$ in the modulated test signal $a_1$ is given by equation (6):

$$\phi(t)=\tan^{-1}[Im\{CN(t)\}/Re\{CN(t)\}] \tag{6}$$

The device under test 4 receives the modulated test signal $a_1$ having undergone fading in which the amplitude and the phase change in accordance with equations (5) and (6).

The testing equipment 5 analyzes the output signal $b_1$ from the device under test 4 to measure the antifading characteristics in the device under test 4.

However, the fading simulator 6 shown in FIG. 9 still suffers the following problems which should be solved.

Since noise signals generated by the noise generators 10a and 10b are pure white Gaussian noise signals, they are stochastic process signals in both the amplitude and phase directions.

Both the amplitude and phase characteristics of the fading signal CN(t) prepared by the noise generators 10a and 10b and the fading filters 11a and 11b therefore change within only a predetermined range determined by the statistical amount.

In other words, the amplitude and phase characteristics of the modulated test signal $a_1$ output from the fading simulator 6 shown in FIG. 9 irregularly change within only the predetermined range.

For this reason, the fading simulator 6 shown in FIG. 9 cannot generate the modulated test signal $a_1$ in which a fading phenomenon having arbitrary amplitude and phase characteristics conforming to practical use conditions has occurred.

In the fading simulator 6, as shown in FIG. 9, the radio-frequency modulated test signal a generated by the modulated signal generation device 3 is demodulated into an original baseband signal by the quadrature demodulator 7. This baseband signal is subjected to fading addition signal processing such as multiplication and addition with a fading signal, and then quadrature-modulated by the quadrature modulator 13 again to obtain the radio-frequency modulated test signal $a_1$ added with fading.

Amplitude balance mismatching, phase balance mismatching, a frequency error, or the like caused by the quadrature demodulator 7 occurs in the modulated test signal $a_1$.

As a result, a disturbance other than a fading characteristic parameter is mixed in the fading-added modulated test signal $a_1$ supplied to the device under test 4.

When the testing equipment 5 measures the antifading characteristics of the device under test 4 by comparing the modulated test signal a output from the modulated signal generation device 3 and the output signal $b_1$ output from the device under test 4 with each other, accurate antifading characteristics cannot be obtained due to the presence of a disturbance parameter other than fading.

BRIEF SUMMARY OF THE INVENTION

It is, therefore, an object of the present invention to provide a modulated signal generation apparatus incorporating a fading simulator in which a fading addition operation is performed for a baseband signal before the signal is input to a quadrature modulator in the modulated signal generation apparatus, thereby adding fading having arbitrary amplitude and phase characteristics to a modulated test signal to be output, the modulated test signal can be output while maintaining high signal precision, the number of necessary components can be greatly decreased to considerably reduce the manufacturing cost, and the test operation efficiency for a device to be tested can be increased.

According to an aspect of the present invention, there is provided a digital communication system modulated signal generation apparatus incorporating a fading simulator for adding fading to a signal to be transmitted to a device to be tested, comprising: a baseband signal generation unit for generating a digital baseband signal at a predetermined clock rate, and sequentially outputting time information corresponding to the predetermined clock rate; fading parameter generation means for receiving the time information sequentially output from the baseband signal generation unit together with the digital baseband signal, and outputting a desired fading parameter set in advance in correspondence with the time information; fading addition operation means for executing a fading addition operation for the digital baseband signal output from the baseband signal generation unit by using the desired fading parameter output from the fading parameter generation means, and outputting a signal indicating a result of the operation; digital/analog conversion means for D/A-converting the signal output from the fading addition operation means; and quadrature modulation means for quadrature-modulating the signal converted by the digital/analog conversion means, and outputting the quadrature-modulated signal as a modulated signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

Reference will now be made in detail to the presently preferred embodiments of the invention as illustrated in the accompanying drawings, in which like reference characters designate like or corresponding parts throughout the several drawings.

The present invention will be generally described. To solve the above problems, in the present invention, a fading simulator is incorporated in a modulated signal generation apparatus for D/A-converting a digital baseband signal output from a baseband signal generation unit by a D/A converter, quadrature-modulating the signal by a quadrature modulator, and outputting the quadrature-modulated signal as a modulated test signal.

The fading simulator comprises a fading parameter memory, a fading edit means for writing a fading parameter at arbitrary time in the output time series of the digital baseband signal in the fading parameter memory upon reception of an external instruction, a timing control means for sequentially reading out fading parameters at respective times stored in the fading parameter memory upon reception of time information sequentially output from the baseband signal generation unit together with the baseband signal, and a fading addition operation unit serving as an operation means inserted between the baseband signal generation unit and the D/A converter to execute a predetermined fading addition operation for the digital baseband signal output from the baseband signal generation unit by using the read fading parameter, and outputting the result to the D/A converter.

The fading simulator having this arrangement is incorporated in the modulated signal generation apparatus for outputting a modulated test signal.

The modulated signal generation apparatus uses the fading addition operation unit to execute a predetermined fading addition operation for the digital baseband signal output from the internal baseband signal generation unit and input to the D/A converter by using each fading parameter at each time stored in the fading parameter memory.

The fading simulator incorporated in the modulated signal generation apparatus of the present invention does not require any demodulator or modulator, unlike a conventional fading simulator. Therefore, the arrangement of the fading simulator can be simplified. In addition, the fading-added modulated test signal to be output can be suppressed in advance from a disturbance more than a desired one caused by mixing of the disturbance parameter of an analog system.

The fading simulator incorporated in the modulated signal generation apparatus of the present invention writes a fading parameter at arbitrary time in the output time series of the baseband signal in the fading parameter memory by using the fading edit means.

The modulated signal generation apparatus of the present invention can add various fading modes programmable in advance to the modulated test signal to be output by setting fading parameters having various characteristics for practical operations in the fading parameter memory, so that various antifading characteristics of a device to be tested can be measured.

The fading simulator incorporated in the modulated signal generation apparatus of the present invention can be used similarly to a conventional fading simulator by writing a noise series in the fading parameter memory.

In another fading simulator incorporated in the modulated signal generation apparatus of the present invention, the fading parameter in the above-described invention is made up of an in-phase parameter component and a quadrature parameter component. The fading edit means obtains the in-phase parameter component and the quadrature parameter component from an amplitude direction parameter string that defines the amplitude characteristics of fading and from a phase direction parameter string that defines the phase characteristics of fading, and writes the obtained components as a fading parameter in the fading parameter memory.

In the fading simulator having this arrangement, the amplitude and phase characteristics of fading added to a modulated test signal to be output can be set individually and arbitrarily.

An embodiment of the present invention based on the above general description will be explained with reference to the several views of the accompanying drawing.

Figure 1:
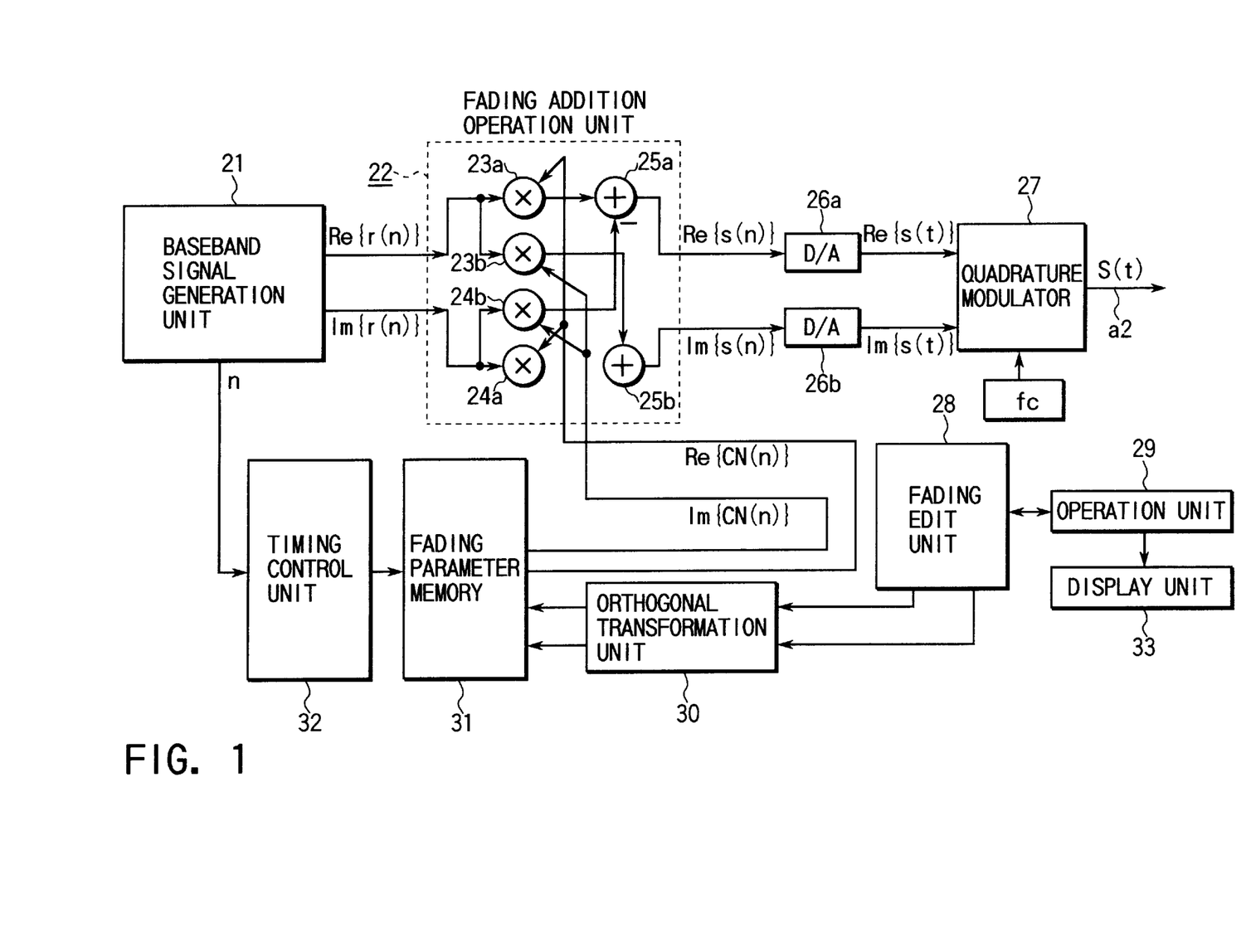
FIG. 1 is a block diagram showing the schematic arrangement of a modulated signal generation apparatus incorporating a fading simulator according to an embodiment of the present invention.

FIG. 1 is a block diagram showing the schematic arrangement of a modulated signal generation apparatus incorporating a fading simulator according to the present invention.

A baseband signal generation unit 21 uses a burst pattern generation device like the one disclosed in Jpn. Pat. Appln. KOKAI Publication No. 8-37485 to spectrum-spread data of a plurality of channels with PN pattern code strings different for respective channels by using a CDMA (Code Division Multiple Access) scheme. Then, the baseband signal generation unit 21 outputs data obtained by adding the plurality of data as a digital baseband signal in synchronism with a clock corresponding to the data transmission rate (transmission speed).

This digital baseband signal is made up of an in-phase component signal $Re\{r(n)\}$ and a quadrature component signal $Im\{r(n)\}$.

Note that n (=0, 1, 2, 3, ... ) is each time information (value) of the output time series. As the time information (value) n is larger, the output time of the baseband signal generation unit 21 is later.

A fading edit unit 28 forms a fading parameter CN(n) in arbitrary time information (value) n in the output time series of the digital baseband signal on the basis of an operation input of the operator in an operation unit 29 constituted by a display, a keyboard, and the like.

More specifically, the fading edit unit 28 sets an amplitude direction parameter string A(n) and a phase direction parameter string $\phi$(n) in the arbitrary time information (value) n of the output time series.

The fading edit unit 28 sends the formed amplitude direction parameter string A(n) and phase direction parameter string $\phi$(n) to an orthogonal transformation unit 30.

The orthogonal transformation unit 30 coordinate-transforms the input amplitude direction parameter string A(n) and phase direction parameter string $\phi$(n) into an in-phase parameter component $Re\{CN(n)\}$ and a quadrature parameter component $Im\{CN(n)\}$ given by equations (7) and (8):

$$Re\{CN(n)\}=A(n) \cos \phi(n) \quad (7)$$

$$Im\{CN(n)\}=A(n) \sin \phi(n) \quad (8)$$

Thus, the fading parameter CN(n) can be written as complex numbers by equation (9):

$$CN(n)=A(n) \exp [\phi(n)]=A(n) \cos \phi(n)+j \cdot A(n) \sin \phi(n) \quad (9)$$

The orthogonal transformation unit 30 writes the fading parameter CN(n) made up of the transformed in-phase parameter component $Re\{CN(n)\}$ and quadrature parameter component $Im\{CN(n)\}$ at each time n in a fading parameter memory 31 in correspondence with an arbitrary address m.

When the fading parameter CN(n) is written in the fading parameter memory 31, the baseband signal generation unit 21 is activated.

Upon activating the baseband signal generation unit 21, the baseband signal generation unit 21 starts outputting the above-mentioned digital baseband signal in synchronism with a clock corresponding to the data transmission bit rate.

The in-phase component signal Re{r(n)} and quadrature component signal Im{r(n)} of the digital baseband signal output from the baseband signal generation unit 21 are respectively input to multipliers 23a and 23b and multipliers 24a and 24b in a fading addition operation unit 22.

The baseband signal generation unit 21 sends each time information n (value) (=0, 1, 2, 3, . . . ) of the output time series to a timing control unit 32 in synchronism with the output timing (output clock) of each data of the baseband signal or the like.

Each time the baseband signal generation unit 21 inputs each time information n (value), the timing control unit 32 sends the address m corresponding to the time information n (value) to the fading parameter memory 31 to read out the in-phase parameter component Re{CN(n)} and quadrature parameter component Im{CN(n)} of the fading parameter CN(n) of this time information n (value) stored at this address m.

In-phase parameter components Re{CN(n)} sequentially read out from the fading parameter memory 31 are input to the multipliers 23a and 24a of the fading addition operation unit 22.

Quadrature parameter components Im{CN(n)} sequentially read out from the fading parameter memory 31 are input to the multipliers 23b and 24b of the fading addition operation unit 22.

An adder 25a adds output signals obtained by multiplying, by the multipliers 23a and 24b, the in-phase component signals Re{r(n)} and quadrature component signal Im{r(n)} of the digital baseband signal output from the baseband signal generation unit 21 with the in-phase parameter components Re{CN(n)} sequentially read out from the fading parameter memory 31. The resultant signal is input as a new in-phase component signal Re{S(n)} to a D/A converter 26a.

An adder 25b adds output signals obtained by multiplying, by the multipliers 24a and 23b, the in-phase component signals Re{r(n)} and quadrature component signal Im{r(n)} of the digital baseband signal output from the baseband signal generation unit 21 with the quadrature parameter components Im{CN(n)} sequentially read out from the fading parameter memory 31. The resultant signal is input as a new quadrature component signal Im{S(n)} to a D/A converter 26b.

The new in-phase component signal Re{S(n)} and quadrature component signal Im{S(n)} having undergone fading by the fading addition operation unit 22 are respectively given by equations (10) and (11):

$$Re\{S(n)\}=[Re\{r(n)\} \times Re\{CN(n)\}]-[Im\{r(n)\} \times Im\{CN(n)\}] \quad (10)$$

$$Im\{S(n)\}=[Re\{r(n)\} \times Im\{CN(n)\}]+[Im\{r(n)\} \times Re\{CN(n)\}] \quad (11)$$

The D/A converters 26a and 26b respectively convert the input digital in-phase component signal Re{S(n)} and quadrature component signal Im{S(n)} into analog in-phase component signal Re{S(t)} and quadrature component signal Im{S(t)}, and send them to a quadrature modulator 27.

The quadrature modulator 27 quadrature-modulates a radio-frequency carrier signal having a frequency $f_c$ with the baseband signals of the in-phase component signal Re{S(t)} and quadrature component signal Im{S(t)}, and externally outputs the quadrature-modulated signal as a radio-frequency modulated test signal $a_2$.

The radio-frequency modulated test signal $a_2$ which has undergone fading and is output from the modulated signal generation apparatus is input to a device 4 to be tested shown in FIG. 8A.

An amplitude fading disturbance factor A(n) in the modulated test signal $a_2$ having undergone fading is given by equation (12):

$$A(n)=[Re\{CN(n)\}^2+Im\{CN(n)\}^2]^{1/2} \quad (12)$$

A phase fading disturbance factor φ(n) in the modulated test signal $a_2$ is given by equation (13):

$$\phi(n)=\tan^{-1}[Im\{CN(n)\}/Re\{CN(n)\}] \quad (13)$$

The device 4 to be tested receives the modulated test signal $a_2$ having undergone fading in which the amplitude and the phase change in accordance with equations (12) and (13).

A test device 5 analyzes the output signal b from the device 4 to be tested to measure the antifading characteristics in the device 4.

The fading simulator having this arrangement is incorporated in the modulated signal generation apparatus for outputting the modulated test signal $a_2$.

In the fading addition operation unit 22, a predetermined fading addition operation is executed for the in-phase component signal Re{r(n)} and quadrature component signal Im{r(n)} constituting the digital baseband signal output from the baseband signal generation unit 21 in the modulated signal generation apparatus and input to the D/A converters 26a and 26b by using the in-phase parameter component Re{CN(n)} and quadrature parameter component Im{CN(n)} constituting the fading parameter CN(n) read out from the fading parameter memory 31.

As described above, the modulated signal generation apparatus incorporating the fading simulator of the present invention does not require the quadrature demodulator 7 or the modulator 13, unlike the conventional fading simulator 6 shown in FIG. 9. Therefore, the arrangement of the fading simulator can be simplified to reduce the manufacturing cost. In addition, the fading-added modulated test signal $a_2$ to be output can be prevented from deterioration in frequency characteristics or the like, or being mixed with various noise components or the like.

In the modulated signal generation apparatus incorporating the fading simulator of the present invention, if the operator designates an amplitude direction parameter string A(n) and a phase direction parameter string φ(n) in arbitrary time information n (=0, 1, 2, 3, . . . ) in the output time series of the baseband signal in the fading edit unit 28 through the operation unit 29, the orthogonal transformation unit 30 coordinate-transforms the amplitude direction parameter string A(n) and the phase direction parameter string φ(n) to form the fading parameter CN(n) made up of the in-phase parameter component Re{CN(n)} and the quadrature parameter component Im{CN(n)}, and writes the fading parameter CN(n) in the fading parameter memory 31.

Figure 5A:
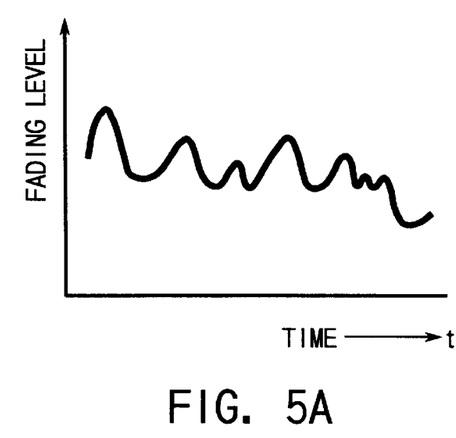
FIGS. 5A and 5B are waveform charts, respectively, showing the signal level of fading added to the modulated test signal.
Figure 5B:
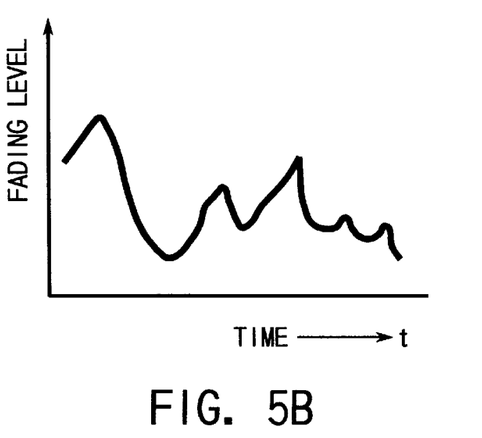

In the modulated signal generation apparatus incorporating the fading simulator of the present invention, for example, if the fading parameter CN(n) having various characteristics for practical operations between a base station 1 and each mobile station 2 in the digital communication system is set in the fading parameter memory 31, fading having various characteristics can be added to the modulated test signal $a_2$ to be output, as shown in FIGS. 5A and 5B. Accordingly, various antifading characteristics of the device 4 to be tested can be measured.

A test method for the base station 1 and the mobile station 2 in the digital communication system adopting the CDMA scheme using the fading simulator incorporated in the modulated signal generation apparatus of this embodiment will be described with reference to FIG. 2 to FIGS. 4A and 4B.

Figure 2:
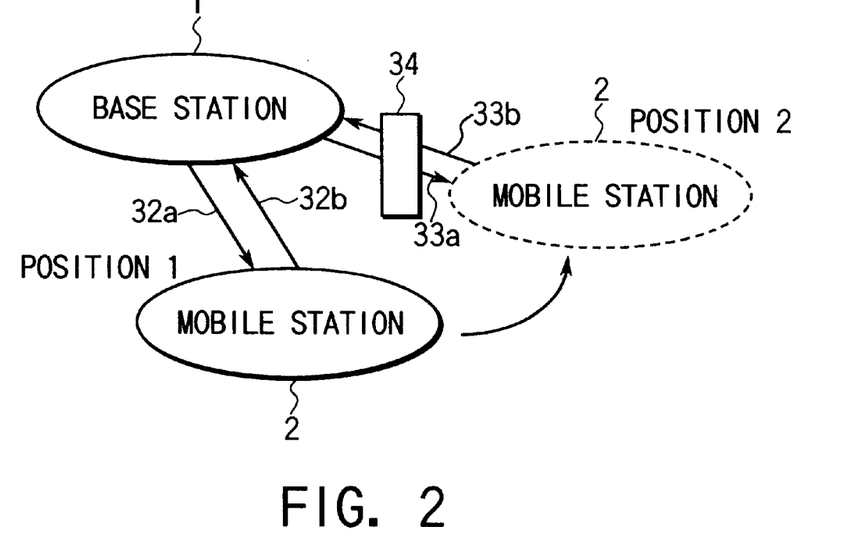
FIG. 2 is a view showing the relationship between a mobile station, an obstacle, and a base station in the digital communication system.

In FIG. 2, the mobile station 2 moves from position 1 to position 2, and upstream and downstream communication transmission paths 32a and 32b between the mobile station 2 and the base station 1 change to other communication transmission paths 33a and 33b.

Assume that an obstacle 34 is undesirably interposed in the communication transmission paths 33a and 33b between the mobile station 2 and the base station 1 after the mobile station 2 moves to position 2.

The standard TIA/EIA INTERIM STANDARD (IS-95) applied to the digital communication system adopting the CDMA scheme employs a method of automatically controlling the transmission power of the mobile station 2 side to the base station 1 to compensate deterioration in transmission/reception signal caused by fading occurring in the upstream and downstream communication transmission paths 32a, 32b, 33a, and 33b present between the base station 1 and the mobile station 2.

Figure 3:
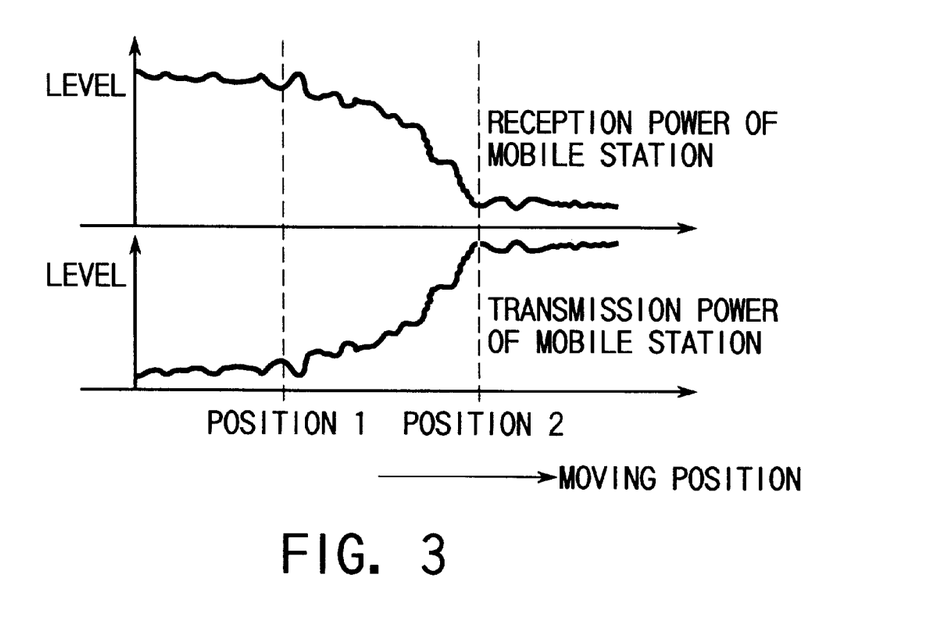
FIG. 3 is a graph showing changes in receive and transmit power levels of reception and transmission signals at each time in the mobile station of the digital communication system.

For example, when the mobile station 2 moves from position 1 to position 2, as shown in FIG. 2, the transmission loss is generated by the obstacle 34 to decrease the reception power of the mobile station 2, as shown in FIG. 3.

In accordance with the decrease in reception power, the mobile station 2 increases the transmission power.

Since the base station 1 also increases the transmission power by the same method, the levels of both signals transmitted through the communication transmission paths 33a and 33b rise to optimal reception levels.

Figures 4A, 4B:
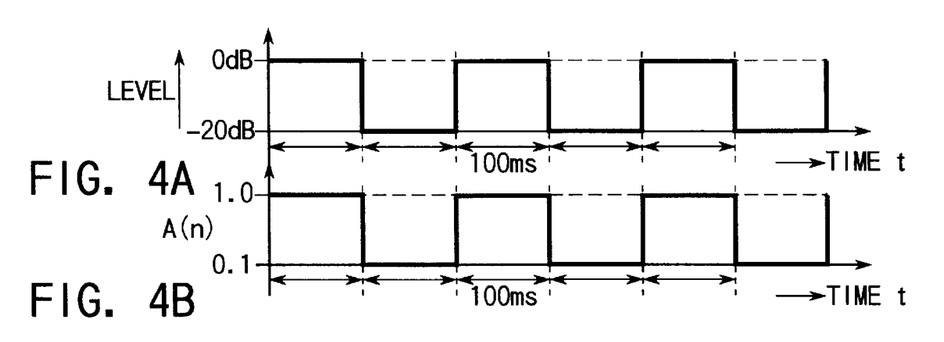
FIGS. 4A and 4B are graphs, respectively, showing changes in transmission power level of the transmission signal over time in the mobile station, and the signal level of fading added to a modulated test signal.

In the digital communication system to which the standard TIA/EIA INTERIM STANDARD (IS-95) is applied, according to the system test standard TIA/EIA INTERIM STANDARD (complying with IS-98), rectangular-wave fading in which the signal level falls by 20 dB every 100 ms must occur in a modulated test signal supplied to the device 4 to be tested, as shown in FIG. 4A.

For this test requirement, in the fading edit unit 28 of the fading simulator according to this embodiment, the amplitude direction parameter string A(n) is set to change the value in each time information (value) n between 1.0 and 0.1 every 100 ms, as shown in FIG. 4B.

In the test standard TIA/EIA INTERIM STANDARD (complying with IS-98), since the phase need not change in fading, the phase direction parameter string φ(n) is set at a constant value of 0.0.

As described above, the relationship between the amplitude and phase direction parameter strings A(n) and φ(n), and the in-phase parameter component Re{CN(n)} and quadrature parameter component Im{CN(n)} of the fading parameter CN(n) is given by equations (14) and (15). By solving these equations, the in-phase parameter component Re{CN(n)} and quadrature parameter component Im{CN(n)} in each time information n which are written in the fading parameter memory 31 are obtained.

$$A(n)=[Re\{CN(n)\}^2+Im\{CN(n)\}^2]^{1/2} \quad (14)$$

$$\phi(n)=\tan^{-1}[Im\{CN(n)\}/Re\{CN(n)\}]=0.0[\text{rad}](\text{constant}) \quad (15)$$

By activating the baseband signal generation unit 21 when the in-phase parameter component Re{CN(n)} and the quadrature parameter component Im{CN(n)} are written in the fading parameter memory 31, the modulated signal generation apparatus can output the modulated test signal $a_2$ added with rectangular-wave fading in which the signal level falls by 20 dB every 100 ms, as shown in FIG. 4A.

Figure 6:
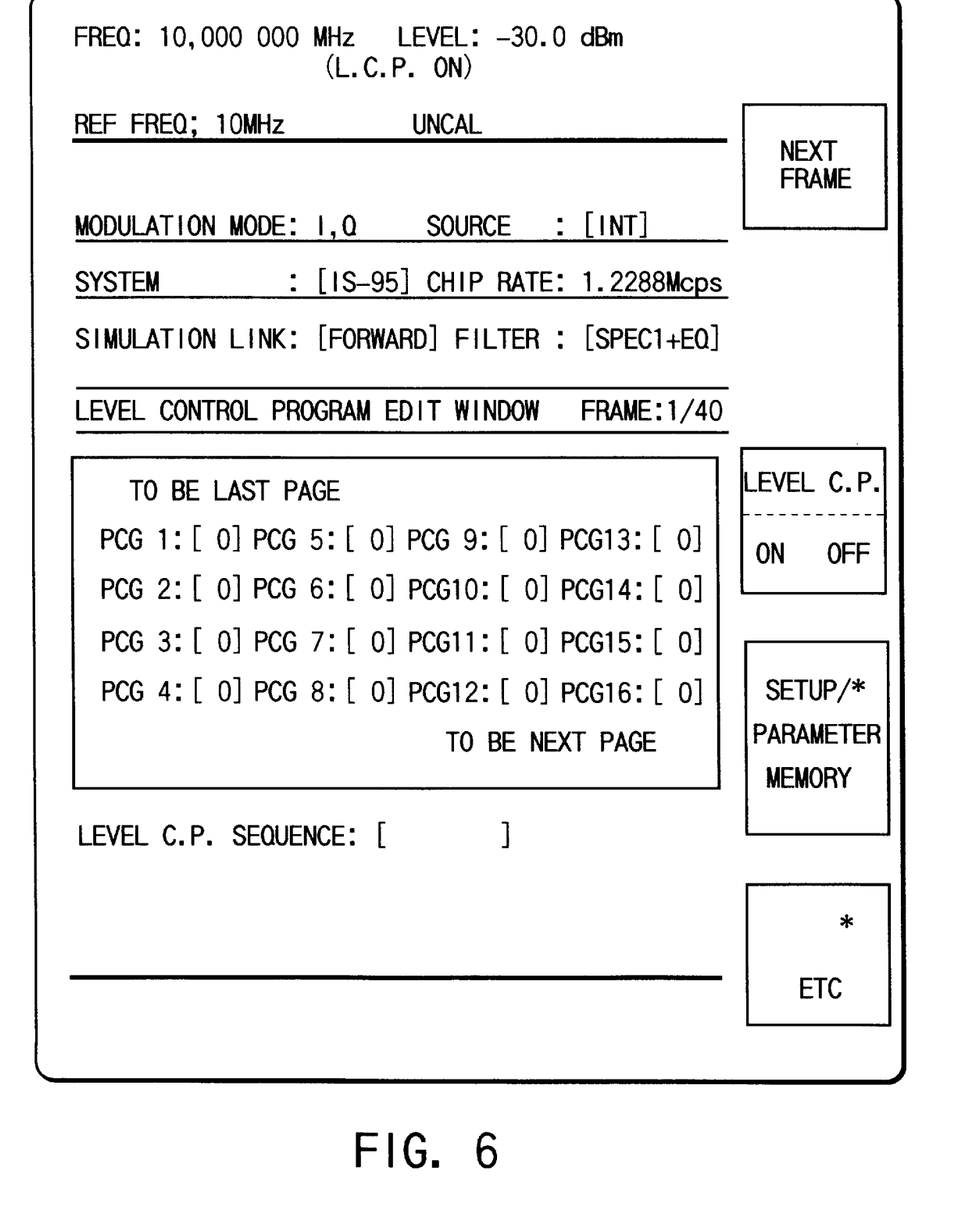
FIG. 6 is a view illustrating the fading setting screen in the manipulation unit and fading edit unit of the fading simulator.

FIG. 6 shows the setting screen.

The setting screen in FIG. 6 is the monitor screen of a display unit connected to the manipulation unit 29. FIG. 6 shows the case wherein 5 frames are output every 100 ms, and the whole cycle is 40 frames.

The setting screen shown in FIG. 6 is the level setting screen of the first frame.

When the operator designates, e.g., a key [Next Frame] with a mouse, the next frame is displayed.

In this case, one frame is further divided into 16 PCGs (Power Control Groups), and all PCG1 to PCG16 are set to 0.

In the test standard shown in FIG. 4A, the fading phase is not referred to. However, in a practical digital communication system, the phase inverts while the radio wave is reflected by or absorbed in an obstacle, or the fading phase greatly changes owing to the phase difference between signals passing through a plurality of communication transmission paths having different lengths.

In this case, the phase at each time (value) n is set in the phase direction parameter string φ(n). From this phase direction parameter string φ(n) and the above-mentioned amplitude direction parameter string A(n), the in-phase parameter component Re{CN(n)} and quadrature parameter component Im{CN(n)} of the fading parameter CN(n) are obtained and set in the fading parameter memory 31.

Since the amplitude or phase characteristics of fading added to the modulated test signal $a_2$ to be output can be arbitrarily set, more intentional antifading characteristics of the device 4 to be tested can be measured.

As has been described above, in the modulated signal generation apparatus incorporating the fading simulator of the present invention, a fading addition operation is performed for a baseband signal before the signal is input to the quadrature modulator in the modulated signal generation apparatus.

According to the modulated signal generation apparatus incorporating the fading simulator of the present invention, a modulated test signal output from the modulated signal generation apparatus can be added with fading having arbitrary amplitude and phase characteristics. In addition, the modulated test signal can be output while maintaining high signal precision. Further, the number of necessary components can be greatly decreased to considerably reduce the manufacturing cost, and the test operation efficiency for a device to be tested can be increased.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A digital communication system modulated signal generation apparatus incorporating a fading simulator for adding fading to a signal to be transmitted to a device to be tested, comprising:

a baseband signal generation unit for generating a digital baseband signal at a predetermined clock rate, and sequentially outputting time information corresponding to the predetermined clock rate;

fading parameter generation means for receiving the time information sequentially output from said baseband signal generation unit together with the digital baseband signal, and outputting a desired fading parameter set in advance in correspondence with the time information;

fading addition operation means for executing a fading addition operation for the digital baseband signal output from said baseband signal generation unit by using the desired fading parameter output from said fading parameter generation means, and outputting a signal indicating a result of the operation;

digital/analog conversion means for D/A-converting the signal output from said fading addition operation means; and quadrature modulation means for quadrature-modulating the signal converted by said digital/analog conversion means, and outputting the quadrature-modulated signal as a modulated signal.

2. An apparatus according to claim 1, wherein said fading parameter generation means comprises:

a fading parameter memory:

fading edit means for writing a fading parameter at arbitrary time in an output time series of the digital baseband signal in said fading parameter memory upon reception of an external instruction; and timing control means for receiving time information sequentially output from said baseband signal generation unit together with the baseband signal, and sequentially reading out fading parameters at respective times stored in said fading parameter memory.

3. An apparatus according to claim 2, wherein the fading parameter includes of an in-phase parameter component and a quadrature parameter component, and said fading edit means obtains the in-phase parameter component and the quadrature parameter component from an amplitude direction parameter string which defines fading amplitude characteristics, and a phase direction parameter string which defines fading phase characteristics, and writes the components as the fading parameter in said fading parameter memory.

4. An apparatus according to claim 3, wherein said baseband signal generation unit spectrum-spreads data of a plurality of channels with PN pattern code strings different for respective channels by using a code division multiple access scheme, and outputs data obtained by adding the data, as a digital baseband signal in synchronism with a clock corresponding to a transmission rate of the data, and the digital baseband signal is constituted by an in-phase component signal and a quadrature component signal.

5. An apparatus according to claim 4, wherein said fading edit unit forms a fading parameter in arbitrary time information in the output time series of the digital baseband signal on the basis of an operation input of an operator in a manipulation unit, and the fading parameter includes an amplitude direction parameter string and a phase direction parameter string in the arbitrary time information of the output time series.

6. An apparatus according to claim 5, wherein said fading parameter generation means further comprises:

an orthogonal transformation unit for coordinate-transforming the amplitude direction parameter string and the phase direction parameter string formed by said fading edit unit into an in-phase parameter component and a quadrature parameter component, and said orthogonal transformation unit writes a fading parameter made up of the transformed in-phase parameter component and quadrature parameter component at each time in said fading parameter memory in correspondence with an arbitrary address.

7. An apparatus according to claim 6, wherein said fading addition operation means comprises:

first and second multipliers for multiplying the in-phase component signal and quadrature component signal of the digital baseband signal output from said baseband signal generation unit with in-phase parameter components sequentially read out from said fading parameter memory;

third and fourth multipliers for multiplying the in-phase component signal and quadrature component signal of the digital baseband signal output from said baseband signal generation unit with quadrature parameter components sequentially read out from said fading parameter memory;

a first adder for adding respective output signals from said first and second multipliers; and a second adder for adding respective output signals from said third and fourth multipliers.

8. An apparatus according to claim 7, wherein the digital baseband signal includes an in-phase component signal $Re\{r(n)\}$ and a quadrature component signal $Im\{r(n)\}$ where n (=0, 1, 2, 3, . . . ) is each time information (value) of the output time series, and indicates that, as the time information (value) n is larger, output time of said baseband signal generation unit is later.

9. An apparatus according to claim 8, wherein said fading edit unit forms an amplitude direction parameter string A(n) and a phase direction parameter string $\phi$(n) in arbitrary time information (value) n of the output time series as a fading parameter CN(n) in the arbitrary time information (value) n in the output time series of the digital baseband signal based on an operation input, and sends the formed amplitude direction parameter string A(n) and phase direction parameter string $\phi$(n) to said orthogonal transformation unit.

10. An apparatus according to claim 9, wherein said orthogonal transformation unit coordinate-transforms the input amplitude direction parameter string A(n) and phase direction parameter string $\phi$(n) into an in-phase parameter component $Re\{CN(n)\}$ and a quadrature parameter component $Im\{CN(n)\}$ given by following equations:

$$Re\{CN(n)=A(n) \cos \phi(n)$$
$$Im\{CN(n)=A(n) \sin \phi(n)$$

thus, the fading parameter CN(n) is written as complex numbers by following equation:

$$Re\{CN(n)=A(n) \exp [\phi(n)]=A(n) \cos \phi(n)+j \cdot A(n) \sin \phi(n)$$

said orthogonal transformation unit writes the fading parameter CN(n) made up of the transformed in-phase parameter component $Re\{CN(n)\}$ and quadrature parameter component $Im\{CN(n)\}$ at each time n in said fading parameter memory in correspondence with an arbitrary address m.

11. An apparatus according to claim 10, wherein the in-phase component signal $Re\{r(n)\}$ and quadrature component $Im\{r(n)\}$ of the digital baseband signal output from said baseband signal generation unit are respectively input to said first and second multipliers and said third and fourth multipliers in said fading addition operation unit, each time information n is input from said baseband signal generation unit, said timing control unit sends an address m corresponding to the time information n to said fading parameter memory, and reads out an in-phase parameter component $Re\{CN(n)\}$ and a quadrature parameter component $Im\{CN(n)\}$ of a fading parameter CN(n) of the same time information n (value) stored at the address m, and in-phase parameter components $Re\{CN(n)\}$ sequentially read out from said fading parameter memory are input to said first and third multipliers of said fading addition operation unit, and quadrature parameter components Im{CN(n)} sequentially read out from said fading parameter memory are input to said second and fourth multipliers of said fading addition operation unit.

12. An apparatus according to claim 11, wherein output signals obtained by multiplying, by said first and third multipliers, the in-phase component signal Re{r(n)} and quadrature component signal Im{r(n)} of the digital baseband signal output from said baseband signal generation unit with the in-phase parameter components Re{CN(n)} sequentially read out from said fading parameter memory are added by said first adder to be sent as a new in-phase component signal Re{S(n)} to a first D/A converter serving as said digital/analog conversion means, output signals obtained by multiplying, by said second and fourth multipliers, the in-phase component signal Re{r(n)} and quadrature component signal Im{r(n)} of the digital baseband signal output from said baseband signal generation unit with the quadrature parameter components Im{CN(n)} sequentially read out from said fading parameter memory are added by said second adder to be sent as a new quadrature component signal Im{S(n)} to a second D/A converter serving as said digital/analog conversion means, the new in-phase component signal Re{S(n)} and quadrature component signal Im{S(n)} having undergone fading by said fading addition operation unit are respectively given by following equations:

$Re\{S(n)\}=[Re\{r(n)\}\times Re\{CN(n)\}]-[Im\{r(n)\}\times Im\{CN(n)\}]$ $Im\{S(n)\}=[Re\{r(n)\}\times Im\{CN(n)\}]+[Im\{r(n)\}\times Re\{CN(n)\}]$ said respective D/A converters convert the input digital in-phase component signal Re{S(n)} and quadrature component signal Im{S(n)} into analog in-phase component signal Re{S(t)} and quadrature component signal Im{S(t)}, and sends the analog signals to a quadrature modulator serving as said quadrature modulation means.

13. An apparatus according to claim 12, wherein said quadrature modulator quadrature-modulates a radio-frequency carrier signal having a frequency $f_c$ with baseband signals of the in-phase component signal Re{S(t)} and the quadrature component signal Im{S(t)}, and externally outputs the quadrature-modulated signal as a radio-frequency modulated test signal, an amplitude fading disturbance factor A(n) in the modulated test signal having undergone fading by said fading addition operation unit is given by following equation:

$A(n)=[Re\{CN(t)\}^2+Im\{CN(n)\}^2]^{1/2}$ and, a phase fading disturbance factor φ(n) in the modulated test signal is given by following equation:

$\phi(n)=\tan^{-1}[Im\{CN(n)\}/Re\{CN(n)\}]$

14. An apparatus according to claim 13, wherein the in-phase parameter component Re{CN(n)} and quadrature parameter component Im{CN(n)} in each time information n to be written in said fading parameter memory are obtained by solving an equation for a relationship between the amplitude direction parameter string A(n) and the phase direction parameter string φ(n) given by equations, and the in-phase parameter component Re{CN(n)} and quadrature parameter component Im{CN(n)} of the fading parameter CN(n).

15. An apparatus according to claim 14, wherein, if said baseband signal generation unit is activated when the in-phase parameter component Re{CN(n)} and the quadrature parameter component Im{CN(n)} are written in said fading parameter memory, said modulated signal generation apparatus can output a modulated test signal added with rectangular-wave fading in which a signal level falls by 20 dB every 100 ms.

16. An apparatus according to claim 15, wherein a setting condition required when said modulated signal generation apparatus outputs the modulated test signal added with rectangular-wave fading in which the signal level falls by 20 dB every 100 ms is displayed on a screen.

17. A digital communication system modulated signal generation apparatus comprising:

transmission signal generation means for generating a signal to be transmitted to a device to be tested; and a fading simulator for adding fading to the transmission signal generated by said transmission signal generation means;

wherein said transmission signal generation means comprises a baseband signal generation unit for generating a digital baseband signal at a predetermined clock rate and sequentially outputting time information corresponding to the predetermined clock rate; and wherein said fading simulator comprises:

fading parameter generation means for receiving the time information sequentially output from said baseband signal generation unit together with the digital baseband signal, and outputting a desired fading parameter set in advance in correspondence with the time information;

fading addition operation means for executing a fading addition operation for the digital baseband signal output from said baseband signal generation unit by using the desired fading parameter output from said fading parameter generation means, and outputting a signal indicating a result of the operation; and digital/analog conversion means for D/A-converting the signal output from said fading addition operation means.

18. An apparatus according to claim 17, wherein said transmission signal generation means comprises quadrature modulation means for quadrature-modulating the signal converted by said digital/analog conversion means, and outputting the quadrature-modulated signal as a modulated signal.

* * * * *